United States Patent
Liberman

(10) Patent No.: US 10,391,451 B2
(45) Date of Patent: Aug. 27, 2019

(54) OSMOSIS APPARATUS

(71) Applicant: I.D.E. TECHNOLOGIES LTD, Kadima (IL)

(72) Inventor: Boris Liberman, Even Yehuda (IL)

(73) Assignee: I.D.E. TECHNOLOGIES LTD., Kadima (IL)

( * ) Notice: Subject to any disclaimer, the term of this patent is extended or adjusted under 35 U.S.C. 154(b) by 417 days.

(21) Appl. No.: 14/785,589

(22) PCT Filed: Apr. 14, 2014

(86) PCT No.: PCT/IB2014/060705
§ 371 (c)(1),
(2) Date: Oct. 19, 2015

(87) PCT Pub. No.: WO2014/170816
PCT Pub. Date: Oct. 23, 2014

(65) Prior Publication Data
US 2016/0059188 A1 Mar. 3, 2016

(30) Foreign Application Priority Data
Apr. 19, 2013 (GB) .................................. 1307151.9

(51) Int. Cl.
*B01D 61/00* (2006.01)
*B01D 61/08* (2006.01)
(Continued)

(52) U.S. Cl.
CPC .......... *B01D 61/08* (2013.01); *B01D 61/002* (2013.01); *B01D 63/10* (2013.01); *B01D 63/103* (2013.01);
(Continued)

(58) Field of Classification Search
CPC ...... B01D 61/08; B01D 61/002; B01D 63/10; B01D 63/103; B01D 63/12;
(Continued)

(56) References Cited

U.S. PATENT DOCUMENTS 3,933,646 A * 1/1976 Kanamaru ........... B01D 63/106
 210/321.83
4,765,893 A * 8/1988 Kohlheb .............. B01D 63/103
 210/315
(Continued)

FOREIGN PATENT DOCUMENTS

GB 1457476 12/1976
JP 2012505749 A 3/2012
(Continued)

OTHER PUBLICATIONS

ISR and WO as issued in PCTIB2014060705 dated Jul. 25, 2014.

*Primary Examiner* — Benjamin L Lebron
(74) *Attorney, Agent, or Firm* — Symbus Law Group, LLC; Clifford D. Hyra

(57) ABSTRACT

An osmosis element comprising a central permeate tube and a membrane element, the membrane having a first part and a second part, the first part having a top edge for location adjacent the central tube, the second part being disposed at the opposite edge, the first part comprising a material to allow water to flow therethrough, the second part comprising at least two adjacent permeate spacers extending from the first part to allow water to flow therethrough, the permeate spacers having a semi-permeable membrane attached to opposed faces of the two adjacent permeate spacers, the first part comprising a barrier extending from the vicinity of the top edge, the central tube comprising an external wall and a longitudinally extending internal separator defining a first channel and a second channel each extending longitudinally of the central permeate tube, at (Continued)

least one first aperture extending from the first channel though the external wall and at least one second aperture extending from the second channel through the external wall.

17 Claims, 7 Drawing Sheets

(51) Int. Cl.
    *B01D 63/10* (2006.01)
    *B01D 63/12* (2006.01)
    *C02F 1/44* (2006.01)
    *F03G 7/00* (2006.01)
    *F04B 43/02* (2006.01)
    *C02F 103/08* (2006.01)

(52) U.S. Cl.
CPC ............... *B01D 63/12* (2013.01); *C02F 1/44* (2013.01); *F03G 7/005* (2013.01); *F04B 43/02* (2013.01); *B01D 2313/12* (2013.01); *B01D 2313/13* (2013.01); *B01D 2313/14* (2013.01); *B01D 2313/146* (2013.01); *C02F 1/445* (2013.01); *C02F 2103/08* (2013.01); *Y02E 10/36* (2013.01)

(58) Field of Classification Search
CPC ............ B01D 2313/12; B01D 2313/13; B01D 2313/146; B01D 2313/086; B01D 2313/14; B01D 2313/143; B01D 53/22; F04B 43/02; C02F 1/44; C02F 1/445; C02F 2103/08; F03G 7/005; Y02E 10/36
See application file for complete search history.

(56) References Cited

U.S. PATENT DOCUMENTS 5,034,126 A     7/1991   Reddy et al.
5,538,642 A *   7/1996   Solie ...................... B01D 53/22
                                                     210/321.83
2010/0224550 A1   9/2010   Herron

FOREIGN PATENT DOCUMENTS

WO     2009154784 A1    12/2009
WO     2010044970 A1    4/2010
WO     2012091871 A1    7/2012

* cited by examiner

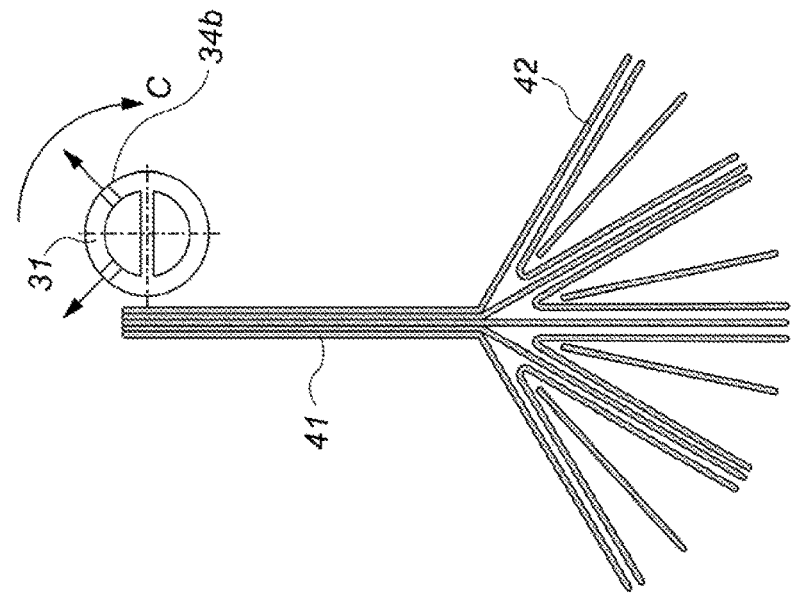
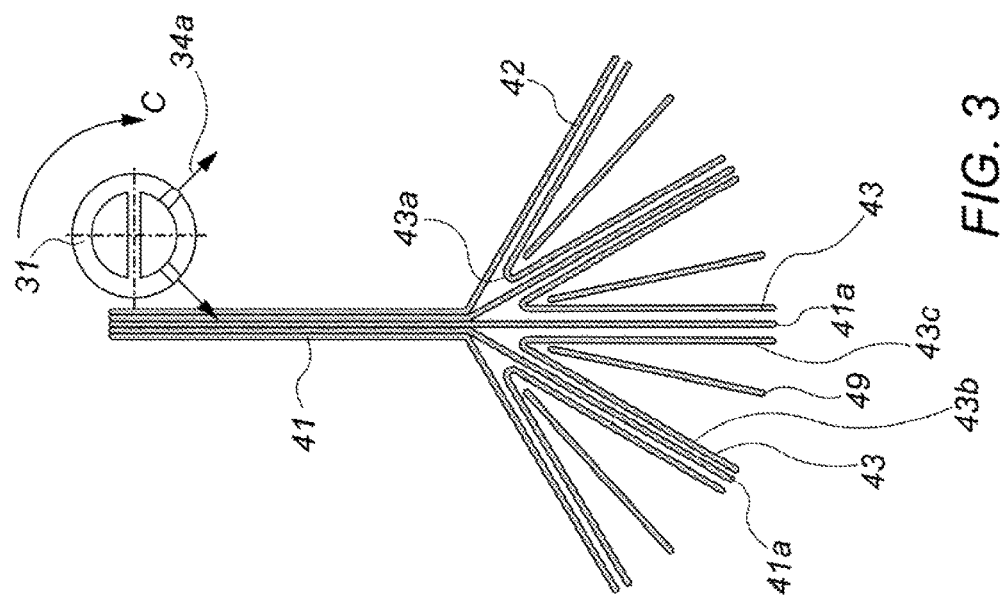

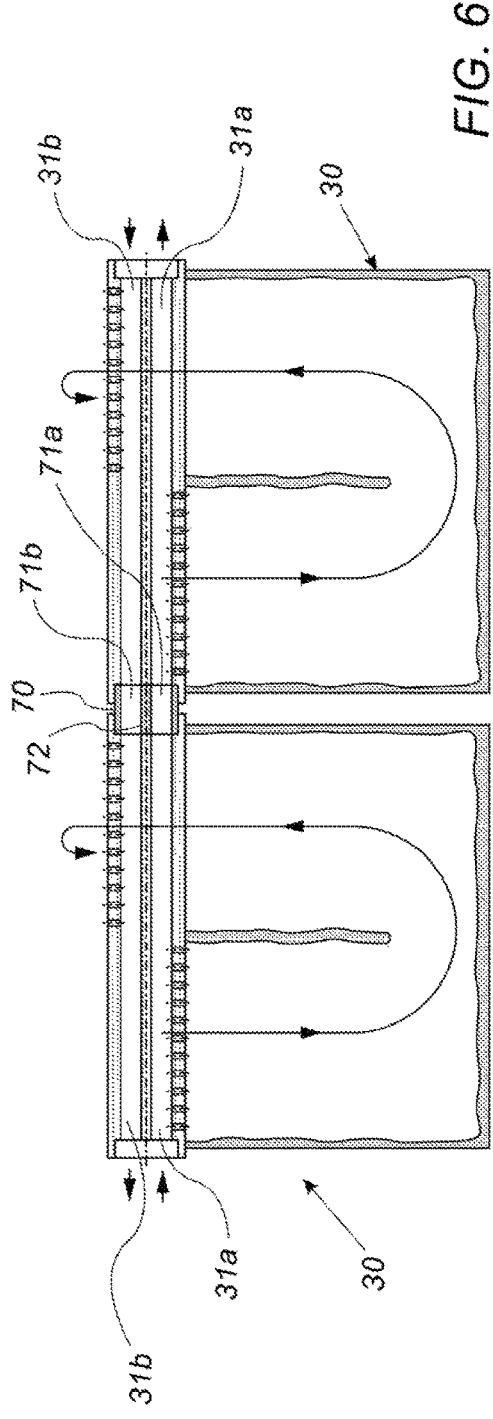
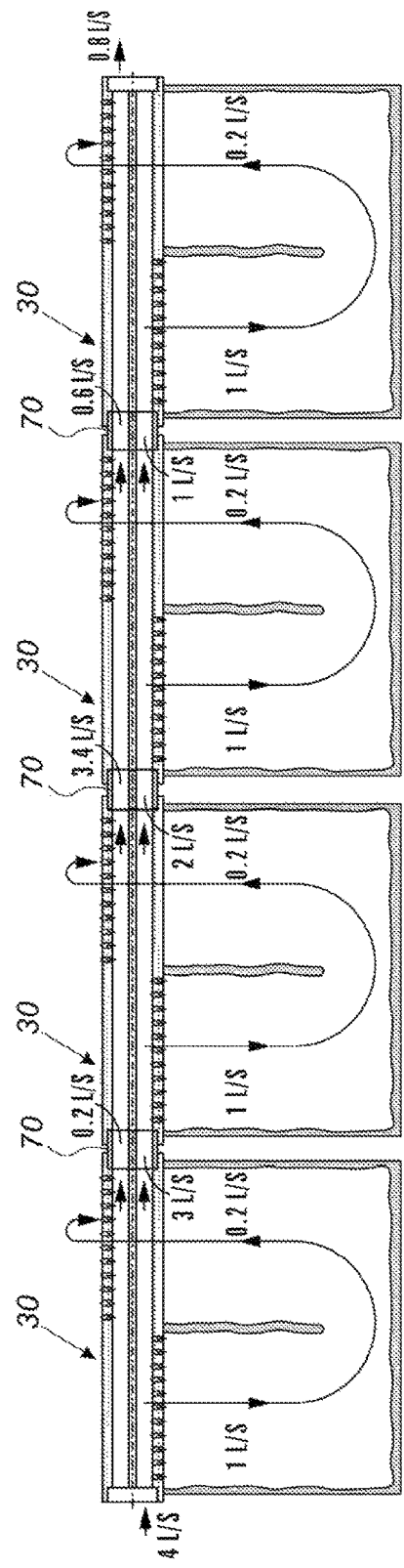
FIG. 6
FIG. 7

OSMOSIS APPARATUS

FIELD OF THE INVENTION

This invention relates to a membrane element, a central tube, an osmosis element having a central tube and membrane, an osmosis apparatus including an osmosis element, and a plant, particularly but not exclusively for pressure-retarded osmosis ("PRO") applications.

BACKGROUND OF THE INVENTION

Osmosis is a known phenomenon in which water moves across a semi-permeable membrane between solutions with lesser and greater concentrations. In forward osmosis, the water moves from the lower concentration solution to the higher concentration solution, while in PRO osmosis the rate of flux of water can be reduced. By applying sufficient pressure to the higher concentration side, osmotic water flow can be reversed and water caused to move across the semi-permeable membrane from the higher to the lower concentration solution. The techniques have found use in a number of fields, including water treatment and desalination. Pressure-retarded osmosis has also been applied in power generation, where the pressure in a saltwater solution is increased by osmosis from a freshwater source, and the pressure is used to drive a turbine.

In known osmosis systems, it is known to use spiral-wrapped osmosis elements, each of which is comprised of a plurality of basic multiple-layer construction blocks in a repeated order. A typical such block comprises a single sheet of semi-permeable membrane which is folded over a feed sheet. The area of the semi-permeable membrane sheet is usually twice the area of the feed sheet spacer. Once the semi-permeable membrane is folded over the feed sheet spacer, the feed sheet spacer separates the two leafs of the folded semi-permeate membrane sheet. The feed sheet is configured to allow free solvent flow along the semi-permeable membrane's surface. The semi-permeable membrane is designed to prevent solute flow. This sandwich of folded semi-permeable membrane with its internal feed spacer is then interposed between spaced permeate spacers. The permeate spacers' area is usually bigger than the area of the folded leafs of the semi-permeable membrane in one dimension, so that once the folded semi-permeable membrane and associated feed spacer is interposed between spaced permeate spacers, a tail consisting of permeate spacers only extends from the interleaved permeate spacers and semipermeable membranes. Feed water supplied across the membrane will flow along the feed spacers contacting the solute rejection skin of the semi-permeable membrane. Multiple basic blocks like that, are spiral-wrapped around a central tube in such a way that each permeate spacers tail drains the water product produced by each basic block into a central tube through dedicated side holes. Feed water is forced to move generally along the longitudinal dimension of the wrapped feed spacers which is parallel to the tube, and permeates flow through the semi-permeable membrane into the permeate spacers and continue in spiral direction toward the central tube.

Spiral wound membranes in the prior art are designed to operate in a reverse osmosis process in which pressurised salt feed water is dewatered and produces fresh water product. In order to function in other applications which require high membrane area to volume, such membranes require some modifications as taught in U.S. Pat. No. 4,033,878. This document teaches a barrier located inside the central tube to force fluid flow to flow out from the central tube to the permeate spacers of the spiral wound membrane through the dedicated side holes. A unidirectional serpentine flow path within the permeate spacer is formed by a flow blocking glue line which extends within the permeate spacer in a direction which is generally perpendicular to the longitudinal axis of the central tube. This additional glue line divides each basic block of the spiral wound as described above, into two zones. All fluid flow in the central tube is blocked and forced out of the central tube into the permeate spacers' tail in the first zone, and flows in a serpentine pattern around the blocking glue line and back to the central tube to a point beyond the blocking means, and is drained back to the central tube through the permeate spacers' tail of the second zone. U.S. Pat. No. 4,033,878 further teaches a train of such osmosis elements connected in serial connection. According to U.S. Pat. No. 4,033,878, in any such element in the train of elements, the entire flow within the first portion of the central tube prior to the blocking means must be shunted out and flow through the spiral wound membrane to reach the second portion of the central tube beyond the blocking means. This serial path causes strong pressure drops and unequal pressure and flow distribution between the elements which limit the system's ability to support high flow rates.

U.S. Pat. No. 8,354,026 shows an improvement to this serial configuration by implementing a perforated vertical blocking means across the central tube. Small internal tube-shunts passing through the blocking means allow parallel flow through all membrane elements connected along a common central tube. This requires multiple tube-shunts which must be accommodated within the central tube diameter. The internal tube-shunts are arranged in an alternating configuration, each bypassing a blocked section of the central tube. As a result there are many sudden diameter contractions and sudden diameter expansions along the fluid flow path. Once the fluid leaves the main central tube and enters a tube-shunt there is a sudden drop in diameter along the flow path and once the fluid leaves the tube-shunt and enters the next blocked section of the central tube there is a sudden diameter expansion. This may cause strong pressure losses and again unequal flow distribution between osmosis elements along a common central tube line. Moreover, the usage of multiple tube-shunts is an ineffective usage of the cross section of the main central tube. In order to accommodate two parallel tubes within the central tube, their maximum diameter should be less than half of the central tube diameter. As a result, the combined area of the cross section of each tube-shunt is much smaller than the area of the cross section of the central tube.

SUMMARY OF THE INVENTION

According to a first aspect of the invention there is provided an osmosis element comprising a central permeate tube and a membrane element, the membrane having a first part and a second part, the first part having a top edge for location adjacent the central tube, the second part being disposed at the opposite edge, the first part comprising a material to allow water to flow therethrough, the second part comprising at least two adjacent permeate spacers extending from the first part to allow water to flow therethrough, the permeate spacers having a semi-permeable membrane attached to opposed faces of the two adjacent permeate spacers, the first part comprising a barrier extending from the vicinity of the top edge, the central tube comprising an external wall and a longitudinally extending internal separator defining at least one first channel and at least one second channel each extending longitudinally of the central permeate tube, at least one first aperture extending from the at least one first channel though the external wall and at least one second aperture extending from the at least one second channel through the external wall The membrane element may be wrapped around the central permeate tube such that water may pass between the first channel and the membrane element and the second channel and the membrane element, and the barrier is disposed to prevent water flow through the first part between the at least one first aperture and the at least one second aperture.

The barrier may comprise a glue line.

Each permeate spacer may be attached to an adjacent semi-permeable membrane by a glue line extending around their common edges The osmosis element may comprise a feed spacer located between the semi-permeable membranes attached to adjacent permeate spacers.

The first part may comprise a plurality of permeate spacers.

The at least one first aperture and at least one second aperture may be longitudinally and/or angularly offset.

The osmosis element may comprise at least one of a plurality of first apertures and a plurality of second apertures.

The longitudinal separator may be disposed that there is no flow communication between the at least one first channel and at least one second channel.

The at least one first channel and at least one second channel may have a substantially constant cross-section along the length of the central permeate tube.

According to a second aspect of the invention there is provided an osmosis apparatus comprising a plurality of osmosis elements according to the first aspect of the invention.

The central permeate tubes of adjacent osmosis elements may be in flow communication through a connector, the connector having at least one first connector channel and at least one second connector channel having the same cross-section as the at least one first channel and at least one second channel.

The osmosis elements may be located in a pressure vessel.

The osmosis apparatus may comprise at least one first inlet to supply a higher concentration solution to the pressure vessel and at least one second inlet to supply lower concentration water to the osmosis elements.

According to a third aspect of the invention there is provided an osmosis plant comprising an osmosis apparatus according to the second aspect of the invention.

The osmosis plant may comprise a power plant

According to a fourth aspect of the invention there is provided a method of generating power using an osmosis plant, the osmosis plant comprising a plurality of osmosis elements according to the first aspect of the invention, the osmosis elements being located in a pressure vessel, the pressure vessel comprising at least one first inlet connected to the pressure vessel and at least one second inlet connected to the osmosis elements, and an outlet from the pressure vessel, the method comprising supplying a higher concentration solution to the first inlet, supplying lower concentration water to the second inlet to cause an increase in pressure at the outlet, and supplying a proportion of higher concentration solution from the outlet to a generation apparatus.

BRIEF DESCRIPTION OF THE DRAWINGS

Embodiments of the present invention will now be described by way of example only with reference to the accompanying drawings wherein;

FIG. 3 is a section on line A-A of FIG. 2, FIG. 4 is a section on line B-B of FIG. 2, FIG. 6 is a diagrammatic illustration of a pair of osmosis elements connected in a first configuration, FIG. 7 is a diagrammatic illustration of four osmosis elements connected in a suitable configuration.

DESCRIPTION OF THE PREFERRED EMBODIMENTS

Figure 1:
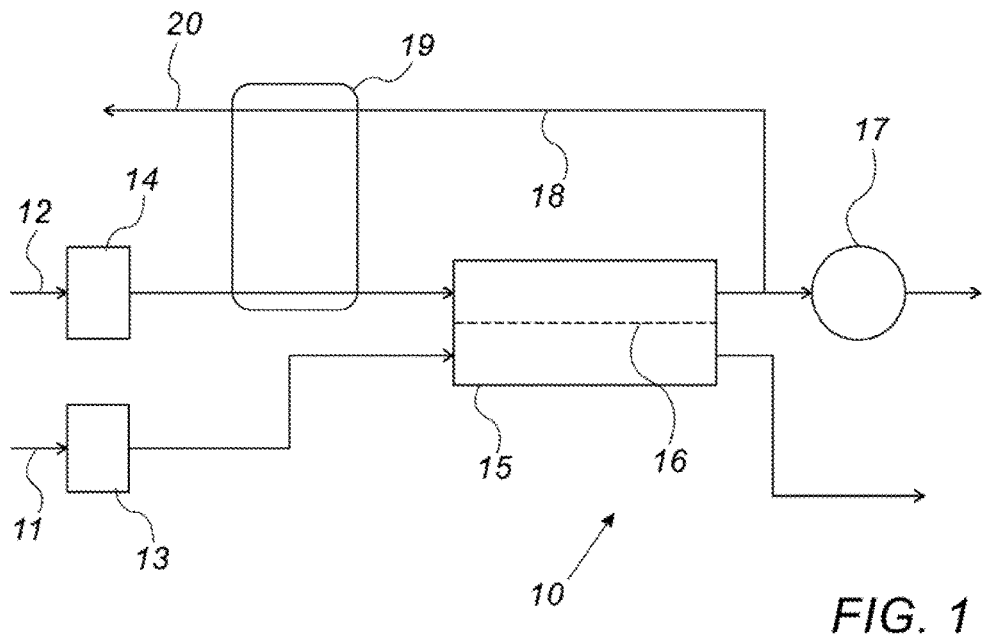
FIG. 1 is a diagrammatic illustration of a PRO power plant.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Referring now to FIG. 1, a diagrammatic illustration of a PRO power plant is shown at 10. Fresh water and sea water are introduced at feed 11, 12, respectively, and filtered in appropriate filters 13, 14. The filtered sea water and fresh water is supplied to an osmotic element 15, where water from the fresh water stream passes through membrane 16 into the sea water stream, increasing the pressure in the sea water stream. About one third of the pressurized sea water stream is supplied to a turbine 17, and about two thirds is returned as shown by connection 18 to a pressure exchanger 19, where the input sea water feed is pressurized. The resulting brackish water is discharged as shown at 20.

Figure 2:
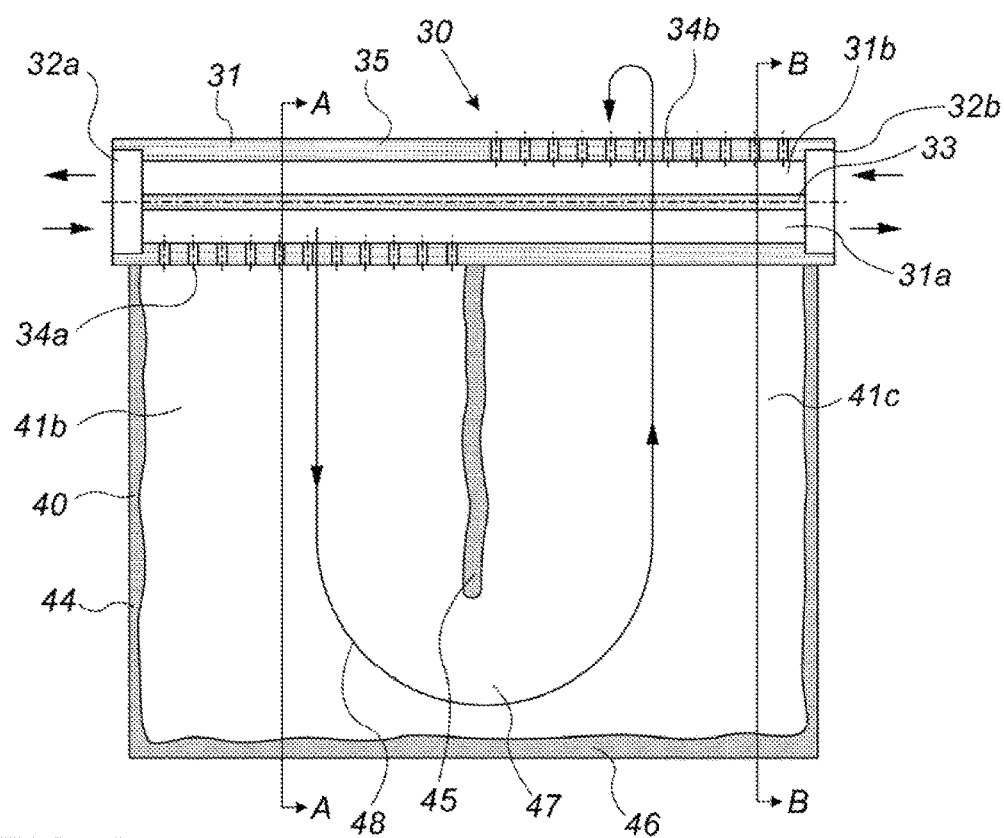
FIG. 2 is a diagrammatic view of an osmosis element embodying the present invention.

Referring now to FIG. 2, an osmosis element embodying the present invention is shown at 30. The osmosis element 30 comprises a central tube 31 having a first channel 31a and second channel 31b extending longitudinally between end sections 32a, 32b. The end sections 32a, 32b each have a larger diameter than the combined width of the channels 31a, 31b. The channels 31a, 31b are separated by central separator 33, such that the channels 31a, 31b are not in flow communication. At longitudinally offset positions, each of channels 31a, 31b has at least one aperture and in this example a respective set of apertures 34a, 34b extending through an external wall 35 of the central tube 31. In this example as seen in FIG. 3, the apertures 34a, 34b are longitudinally offset such that there is no overlapping longitudinal portion between them. As seen in FIGS. 3 and 4, the central tube 31 in this example is circular in cross-section. The apertures 34a, 34b are angularly offset, in this example by about 120. It will be apparent the apertures may be in-line, on opposite sides of the tube 31, may longitudinally overlap provided the barrier 45 (see below) prevents direct flow between the apertures 34a, 34b, need not be aligned parallel to the longitudinal axis, and may generally be arranged otherwise as suitable. As seen in FIGS. 2 to 4, the channels 31a, 31b have substantially the same cross-section along their lengths, such that there is no substantial change in the cross-sectional area, thus avoiding or minimising pressure drops and flow irregularities. In this example, the channels 31a, 31b are the same size, but may be differently sized as shown below.

A membrane element 40 is provided to provide a flow path between apertures 34a, 34b. In FIGS. 2 to 4, the membrane element 40 is shown in an unwound position. As illustrated by arrows C, to assemble the osmosis element 30 the membrane element 40 is wound or wrapped around the central tube 31. The membrane element 40 comprises a plurality of layers 41a, each comprising a permeate spacer through which water can pass or flow easily, such as a porous material. The membrane element 40 comprises a first proximal end part 41, with a top edge for location adjacent the central tube 31, so that the first end part 41 which is located adjacent to the central tube 31 when the membrane element is wrapped around the central tube 31. The first end part 41 has a length sufficient to completely extend at least once around the central permeate tube 31 (i.e., the first part has a length of 2πR where R is the diameter of the central permeate tube 31). The layers 41a in the first part 41 are joined together. At the second end 42, located at the opposite edge of the first end part 41 to the top edge, the permeate spacers 41a are separated, and a folded semi-permeable membrane 43 is located between adjacent permeate spacers 41a such that a fold line 43a of the membrane 43 is located towards the first end 41, each semi-permeable membrane forming a pair of leaves 43b, 43c. Each leaf 43b, 43c of the membrane 43 is bonded to an adjacent permeate spacer layer 41a by a barrier comprising a peripheral glue line 44, as seen in FIG. 3. The glue line 44 provides an impermeable or at least water-flow-resistant barrier around the common edges of the membranes 43 and permeate spacers 41a in the second part 42, and around the permeate spacers' edges in the first part 41. To allow for a free flow of water adjacent to the membranes 43, feed spacers 49 are located between adjacent leaves 43b, 43c to hold the leaves 43b, 43c separate. The feed spacers 49 may comprise plastic grids, for example.

To prevent water flowing directly from apertures 34a to 34b within the first end 41, a barrier comprising a central glue line 45 extends generally centrally of the membrane element 40 from the vicinity of the top edge located adjacent the central tube 31 in the direction towards a distal, outside edge 46, defining a first zone 41b and 41c of the first proximal end part 41. An unglued gap 47 is left between the distal edge 46 and glue line 45. Glue line 45 is located such that, when the membrane element 40 is wrapped around central tube 30, the glue line 45 forms a barrier between apertures 34a, 34b. Water flowing between channels 31a, 31b is forced to follow a looped path as shown by arrow 48 through the membrane element 40 and around the end of glue line 45. The size, area and location of the apertures 34a, 34b may be selected in accordance with the desired flow rate between the central tube 31 and membrane element 40. Although the membrane element described has a plurality of permeate spacer layers 41a which are joined to form the first proximal end part 41, it will be apparent that the first part 41 may be formed monolithically or separately from the second part 42, or otherwise.

Accordingly, when low salinity water is supplied through the first channel 31a of the central tube 31, some of the water passes through apertures 34a and into the first zone 41b of the membrane element 40. The glue line 45 forces the water to pass into the second end 42 of the membrane element 40 and flow along the separated layers 41a. Within the second end 42, some of the water will pass through the semi-permeable membrane 43 into the high salinity water flowing along the feed spacers 49. The remainder of the water will pass into the second zone 41c of the membrane element 40, through apertures 34b and into the second channel 31b.

Figure 5:
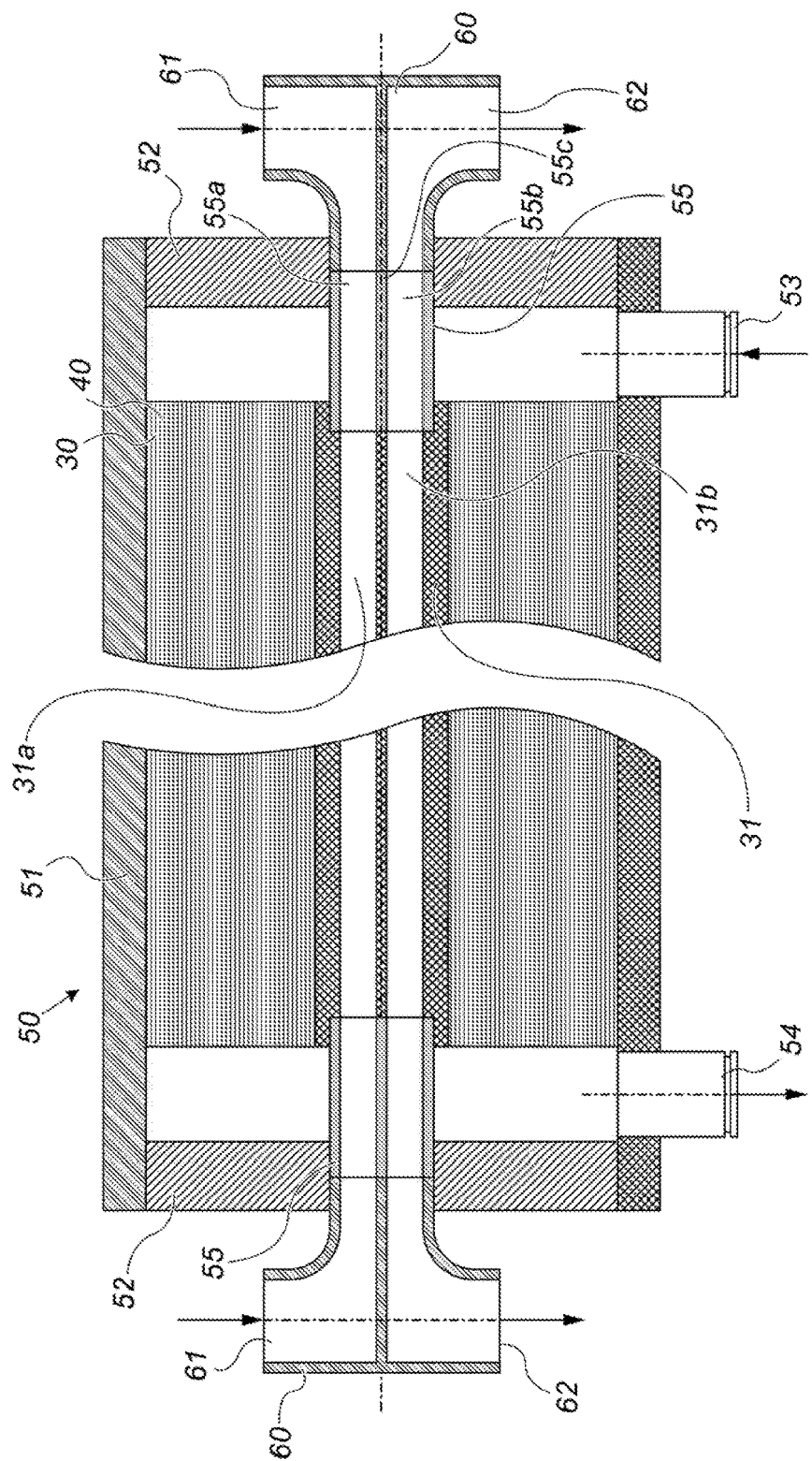
FIG. 5 is a cross-section of an osmosis apparatus including at least one osmosis element of FIG. 2.
Figure 8:
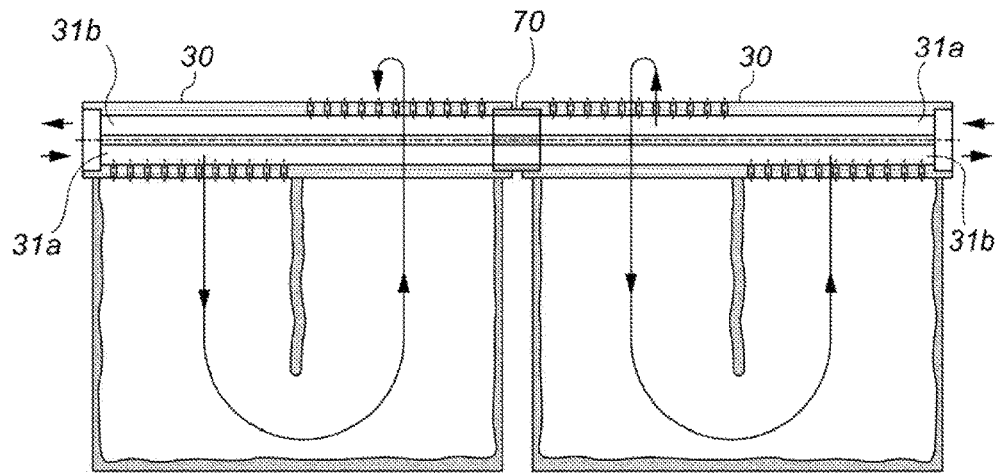
FIG. 8 is a diagrammatic illustration of a pair of osmosis elements connected in a second configuration.

FIG. 5 shows an osmosis pressure vessel comprising an osmosis element 30 (in practice, as discussed below, the pressure vessel may contain at least two osmosis elements 30). As seen in FIG. 5, the osmosis element 30 is mounted within a pressure vessel 50 having an outer container 51 closed by end caps 52. The membrane elements 40 are wrapped around the central tube 31 and are contained within a cylindrical casing (not shown). A first inlet 53 feeds high salinity water under pressure into the pressure vessel 50, where it passes longitudinally of the vessel through the feed spacers 49 and leaves through outlet 54. Connectors 55 are shown received in end sections 32a, 32b of the osmosis element 30, and similarly comprise first and second channels 55a, 55b separated by a central separator 55c, such that channel 31a is in flow communication with channel 55a and channel 31b is in flow communication with channel 55b. To provide for supply of low salinity water to the osmosis element 30, end connectors are provided as shown at 60, each having a second inlet port 61 in flow communication with channel 55a and an outlet port 62 in flow communication with channel 55b. Where the pressure vessel 50 contains a plurality of osmosis elements, then end sections 32a 32b will belong to different osmosis elements.

Accordingly, in operation, fresh or low salinity water is supplied to the inlet ports 61 of end connectors 60 and passes into channel 31a of the osmosis element 30. The fresh water passes through apertures 34a and in a generally spiral direction through layers 41a. Sea water, or a higher concentration solution, is introduced into the pressure vessel under pressure at inlet 53, and flows lengthwise of the pressure vessel along the spaces defined by spacers 49. Fresh water diffuses from the membrane element 40 through the semi-permeable membranes 43 into the sea water, thus increasing the pressure at the outlet feed 54.

An advantage of the present invention is that a plurality of the osmosis elements 30 may be connected in alternative configurations depending on the required operation, as illustrated in FIGS. 6 to 9. FIGS. 6 and 7 show two osmosis elements 30 connected via a connector 70. The connector 70 has an external dimension such that it fits closely within end sections 32a, 32b, preferably to provide a sealing fit. The connector 70 has first and second channels 71a, 71b separated by a centre partition 72, having the same dimensions of channels 31a, 31b and central separator 33. The connector 70 thus provides an uninterrupted connection between adjacent osmosis elements 30 without causing any constriction or flow interruption. Interfitting elements (not shown) can be provided on the osmosis element 30 and connector 70 to ensure that the channels 71a, 71b are correctly aligned with the channels 31a, 31b. If preferred, of course, the connector 70 may be dimensioned to engage external surfaces of the central permeate tubes 31.

In FIG. 6, the osmosis elements 30 are effectively connected in parallel. In each element, water passes from channel 31a through apertures 34a, flows through the membrane element 40 and is returned via apertures 34b to channel 31b. An advantage of the present parallel connection allows smooth flow with minimal pressure drops and friction for water, which has not passed through apertures 34a of the first osmosis element, down to the next osmosis element. Part of this down-stream flow may be directed through the next set of apertures 34a of the next osmosis element into its respective membrane element 40 and part of this down-stream flow may further continue to flow smoothly to the next inline osmosis element. In this example water flows along channels 31a and 31b in opposite directions, but the flows may be arranged as appropriate.

FIG. 7 is similar to FIG. 6, but shows four osmosis elements connected in a parallel configuration, and where the water flows along channels 31a, 31b in the same direction. In the example values shown in the figure, 4 liters/second is supplied to channel 31a. 1 liter passes into the membrane element 40 of each osmosis element 30, of which 0.8 l/s passes through the semi-permeable membrane 43 and 0.2 l/s is returned through apertures 34b to channel 31b. In this example, the advantageous parallel configuration is apparent. The pressure and flow of water is evenly divided among the osmosis elements within the same pressure vessel and sharing a common connection through central permeate tubes 31 and connectors 70, such that the same volume of water flows out through each osmosis element In FIG. 8, the adjacent osmosis elements 30 are connected in an alternative mirror-image configuration.

Figure 9A:
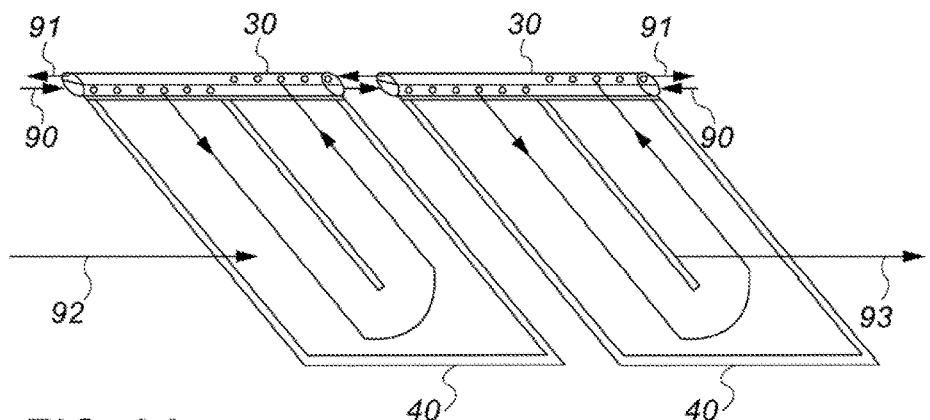
FIGS. 9a and 9b are diagrammatic illustrations of flow configurations for an osmosis apparatus.
Figure 9B:
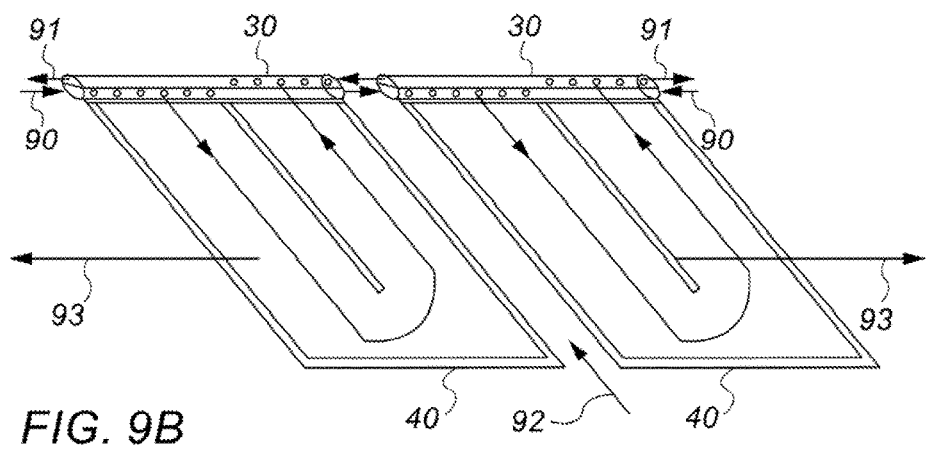

FIGS. 9a and 9b show two different flow configurations for an osmosis apparatus. FIG. 9a shows effectively the arrangement of the pressure vessel of FIG. 5, having two fresh or low-salinity water inlets 90 supplying the connected osmosis elements 30 from both ends and two outlets 91 similarly draining the osmosis elements at each end of the row, with one sea water or high-salinity water inlet 92 and one outlet 93. FIG. 9b shows an alternative configuration where the seawater inlet 92 is located in a central position of the osmosis apparatus, and two outlets 93 are provided at opposite ends of the apparatus. This configuration may be desirable where, for example, the desired level of permeation occurs after the sea water has passed 4 osmosis elements but where the pressure vessel holds 8 osmosis elements. In this case, the sea water is supplied centrally and flows left and right as shown in the figure, interacting with the desired number of osmosis elements before reaching the outlet.

Figure 10:
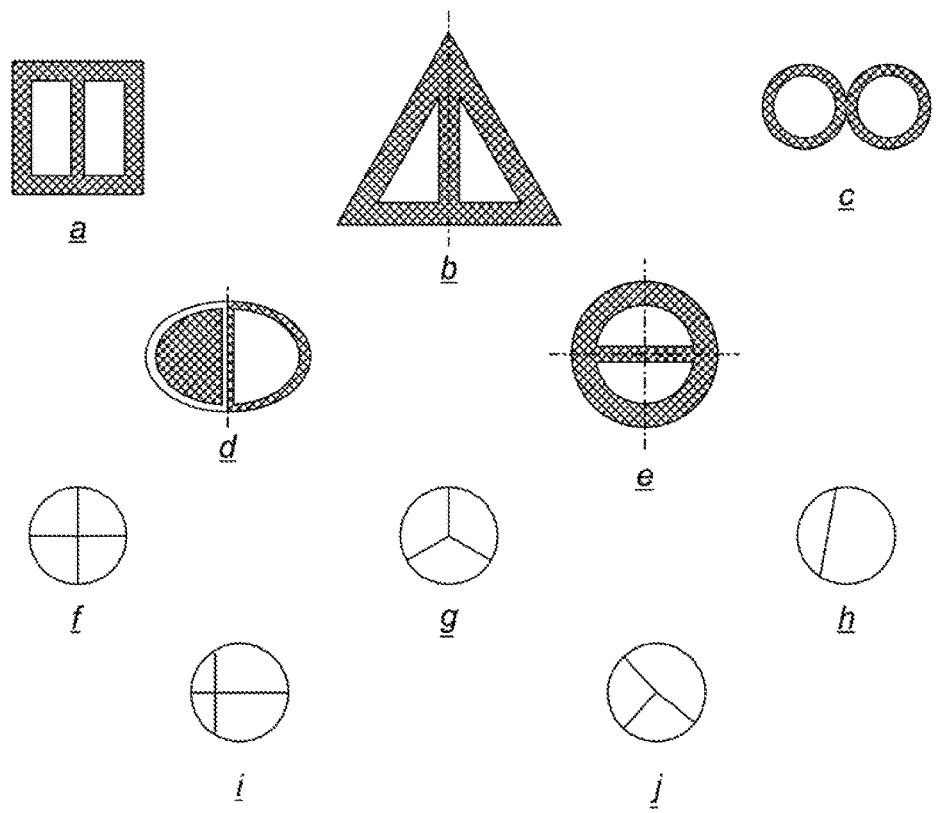
FIGS. 10a to 10j are alternative perpendicular cross-sectional views of a longitudinal central tube of a pressure element of FIG. 3.

The central permeate tube 31 may have any suitable cross-section and any suitable arrangement of longitudinal separators as desired, and alternative variants are shown in FIGS. 10a to 10i. FIGS. 10a to 10d show square, triangular, side-by-side circular channels, and oval tube cross-section with the circular tube from FIG. 2 shown at 10e for comparison. The central tube may have more than 2 channels, for example three or four as shown in FIGS. 10f and 10g. In embodiments incorporating more than 2 channels, any single channel may operate as channel 31a, which feeds a membrane element 40 with low salinity water, or as channel 31b, which drains a membrane element 40. Membrane elements 40 may be attached to the central tube 31 through their respective parts 41, in such a way that will associate any single membrane element 40, out of a plurality of membrane elements 40 in a single osmosis element, with a specific channel in order to optimize pressure and flow distribution and maximize the osmosis effect. The channels may have different cross-sectional areas depending on the desired or expected water flow in each channel as illustrated in FIGS. 10h to j. Whatever the cross-section of the central permeate tube 31, it will be apparent that connectors 70 to connect adjacent permeate tubes 31 must have the same internal cross-section as the permeate tubes, to maintain a consistent cross-section along the length of an osmosis apparatus.

Figure 11:
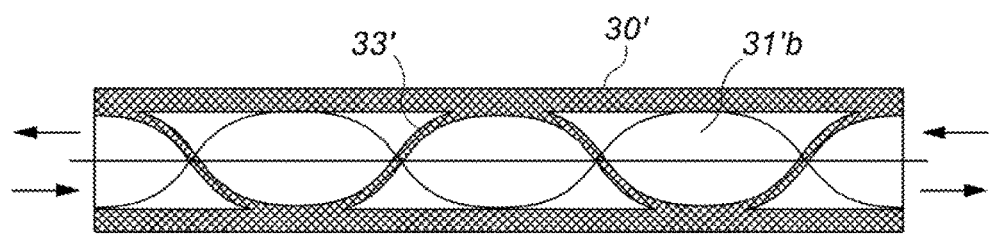
FIG. 11 is a longitudinal cross section through an alternative longitudinal central tube of a pressure element of FIG. 3.
Figure 12:
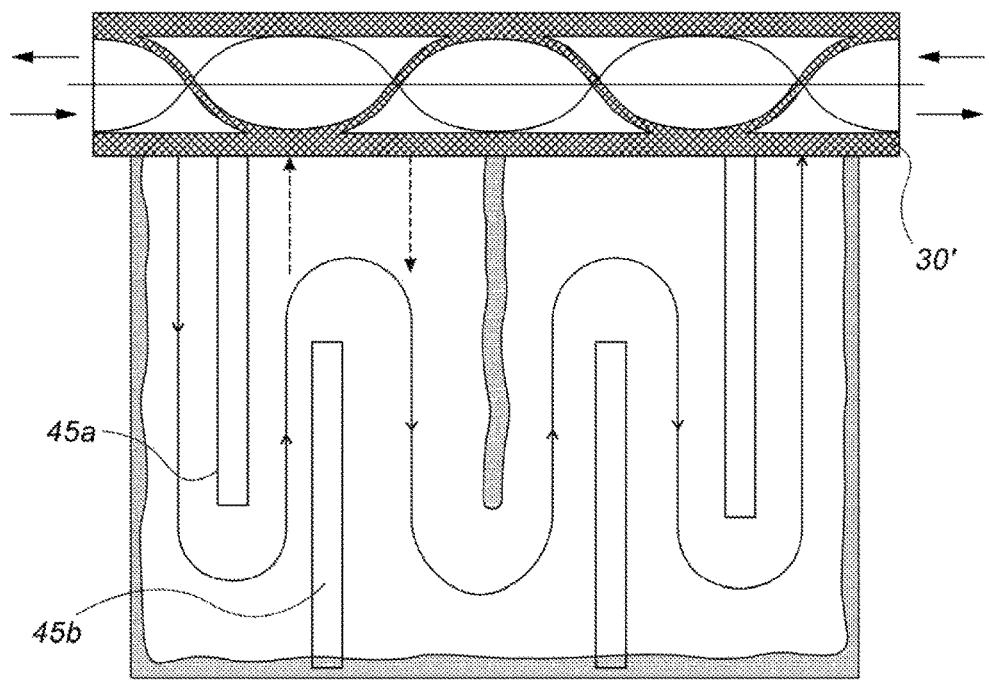
FIG. 12 is a diagrammatic view of an osmosis element including the centre tube of FIG. 11.

The channels need not be straight. FIG. 11 shows an alternative central tube 30 in which the central separator 33' is a spiral, such that the channels 31'a, 31'b) comprise a pair of intermeshing spiral channels. As shown in FIG. 12 the central tube 31' may be used with a membrane element 40' having a plurality of alternating glue lines 45'a, 45'b to create a labyrinth. The spacing of the glue lines 45'a, 45'b is selected to be a fraction or multiple of the spiral height of the central barrier 33'. In this example the labyrinth flow path dictated by the multiple glue lines 45'a, 45'b 45'c 45'd etc may create a flow pattern within the membrane element 40 having a wave pattern. The wave pattern flow is characterized by U-turns like "minimas" which are distal to the central tube 30' and U-turn's like "maximas" which are proximal to the central tube 30'. Multiple arrays of apertures may create flow communications between two channels 31'a and 31'b and the wave patterned flow in the membrane element around the areas of at least one of the proximal "maximas" to further feed water to or discharge water from the membrane element to a respective channel to further enhance and optimize the overall effect of the osmosis process.

Figure 13:
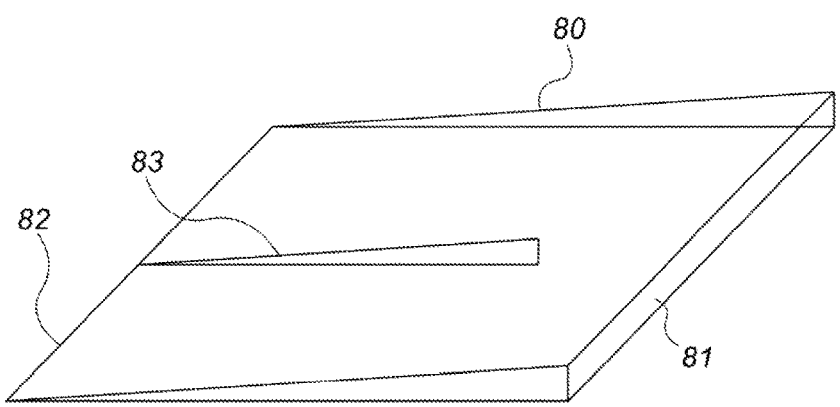
FIG. 13 is a perspective view of an alternative permeate spacer.

To allow for increased or easier flow of water in the membrane element 40 adjacent the central tube 31 or membranes 43, each permeate spacer may have a variable thickness. An example spacer is shown at 80 in FIG. 13. The spacer 80 has a generally wedge-shaped configuration, tapering from a face part 81 to a tip part 82. The barrier 83, equivalent to barrier 45 extends within the spacer from the tip part 82 towards the face part 81. A membrane element similar to membrane element 40 may be formed from a plurality of permeate spacers 80. It is desirable to have as great a volume as possible within the permeate spacers, but the relatively limited space available close to the central permeate tube 31 when the membrane element is wound in place limits the practical thickness of the permeate spacer. By providing a variable-thickness permeate spacer as shown in FIG. 13, the thickness can be maximised towards the periphery.

A plant incorporating osmosis elements 30 may comprise a large number of such elements to provide a desired surface area for osmosis to occur. For example, each membrane element may have an area of 172 $m^2$, and a group of pressure vessels, or 'train', might have 50 pressure vessels each containing 8 osmosis elements. Hence, each train has a membrane area of about 68,800 m² and a plant may use a plurality of such trains.

Accordingly, the osmosis elements and apparatus described herein may be used in a plant as shown in FIG. 1, to supply power. Accordingly the osmotic element 15 of FIG. 1 may comprise a train of osmosis vessels as described above. By supplying low salinity water or fresh water to the central permeate tubes 31 of the osmotic elements, and high salinity water or sea water to the pressure vessels 50, a suitable pressure increase may be generated at the outlet of the pressure vessel so that a proportion of the higher concentration solution from the outlet can be supplied to a generation apparatus such as a turbine 17.

Although the present invention has been described with reference to use in a PRO plant for power generation, it will be apparent that osmosis elements and membrane elements as described herein may be used for any suitable purpose, including desalination, water treatment, and industrial dewatering and concentration processes.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

Meanings of technical and scientific terms used herein are to be commonly understood as by one of ordinary skill in the art to which the invention belong, unless otherwise defined.

The invention claimed is:

1. An osmosis element comprising a central permeate tube and a membrane element,
   the membrane element having a first part and a second part, the first part having a top edge for location adjacent the central permeate tube, the second part being disposed at the opposite edge, the first part comprising a material to allow water to flow therethrough, the second part comprising at least two nearby permeate spacers extending from the first part to allow water to flow therethrough, the at least two nearby permeate spacers having a semi-permeable membrane attached to opposed faces of the at least two nearby permeate spacers,
   the central permeate tube comprising an external wall comprising a first end section and a second end section, the central permeate tube further comprising a longitudinally extending internal separator defining at least one first channel and at least one second channel each extending longitudinally from the first end section to the second end section within the central permeate tube, wherein the at least one first channel and the at least one second channel are open to flow at both the first end section and the second end section, at least one first aperture extending from the at least one first channel though the external wall and at least one second aperture extending from the at least one second channel through the external wall, the at least one first and second apertures being longitudinally offset.

2. An osmosis element according to claim 1 wherein the membrane element is wrapped around the central permeate tube such that water may pass between the at least one first channel and the membrane element and the at least one second channel and the membrane element, and the barrier is disposed to prevent water flow through the first part between the at least one first aperture and the at least one second aperture.

3. An osmosis element according to claim 1 wherein the barrier comprises a glue line.

4. An osmosis element according to claim 1 wherein each of the at least two nearby permeate spacers is attached to an adjacent semi-permeable membrane by a glue line extending around their common edges.

5. An osmosis element according to claim 1 comprising a feed spacer located between the semi-permeable membranes attached to the at least two nearby permeate spacers.

6. An osmosis element according to claim 1 wherein the first part comprises the at least two nearby permeate spacers.

7. An osmosis element according to claim 1 wherein the at least one first aperture and at least one second aperture are angularly offset.

8. An osmosis element according to claim 1 comprising at least one of a plurality of first apertures and a plurality of second apertures.

9. An osmosis element according to claim 1 wherein the longitudinal separator is disposed such that there is no flow communication between the at least one first channel and the at least one second channel through the longitudinal separator.

10. An osmosis element according to claim 1 wherein the at least one first channel and the at least one second channel have a substantially constant cross-section along the length of the central permeate tube.

11. An osmosis apparatus comprising a plurality of osmosis elements according to claim 1.

12. An osmosis apparatus according to claim 11 wherein the central permeate tubes of adjacent osmosis elements of the plurality of osmosis elements are in flow communication through a connector, the connector having at least one first connector channel and at least one second connector channel having the same cross-section as the at least one first channel and the at least one second channel.

13. An osmosis apparatus according to claim 11 wherein the plurality of osmosis elements are located in a pressure vessel.

14. An osmosis apparatus according to claim 13 comprising at least one first inlet to supply a higher concentration solution to the pressure vessel and at least one second inlet to supply lower concentration water to the osmosis elements.

15. An osmosis plant comprising an osmosis apparatus according to claim 11.

16. An osmosis plant according to claim 15 comprising a power plant.

17. A method of generating power using an osmosis plant, the osmosis plant comprising a plurality of osmosis elements according to claim 1, the plurality of osmosis elements being located in a pressure vessel, the pressure vessel comprising at least one first inlet connected to the pressure vessel and at least one second inlet connected to the osmosis elements, and an outlet from the pressure vessel,
   the method comprising supplying a higher concentration solution to the first inlet, supplying lower concentration water to the second inlet to cause an increase in pressure at the outlet, and supplying a proportion of the higher concentration solution from the outlet to a generation apparatus.

* * * * *